Figure 1:
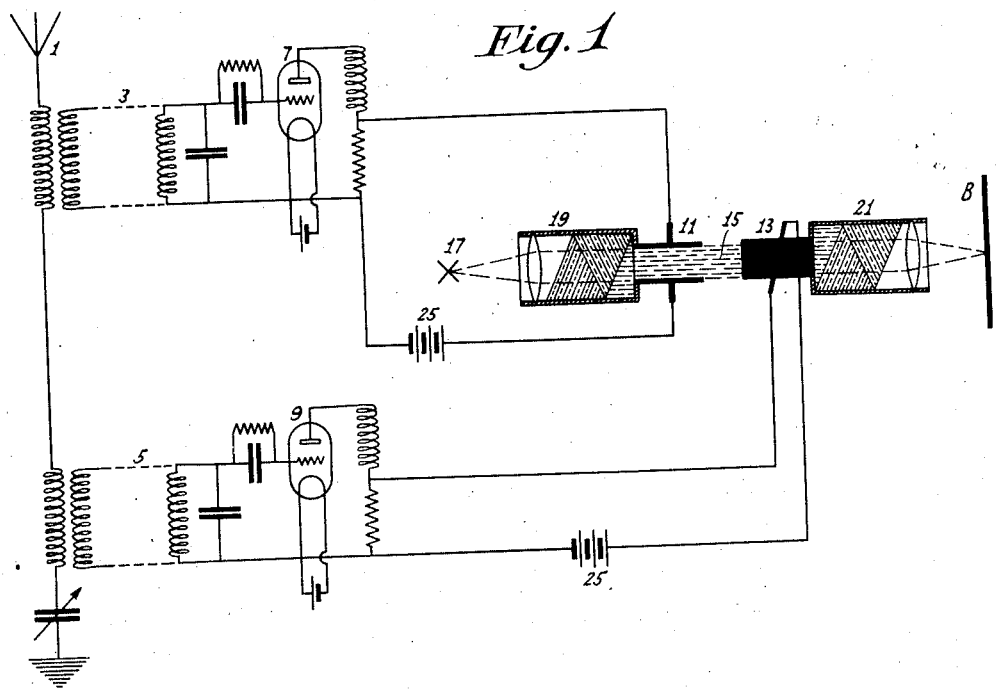

July 31, 1928.

F. SCHRÖTER 1,678,653

SYSTEM FOR REDUCING STATIC DISTURBANCES

Filed May 13, 1926

INVENTOR
FRITZ SCHROETER
BY Ira J. Adams
ATTORNEY

Patented July 31, 1928.

1,678,653

UNITED STATES PATENT OFFICE.

FRITZ SCHRÖTER, OF BERLIN, GERMANY, ASSIGNOR TO GESELLSCHAFT FÜR DRAHT-LOSE TELEGRAPHIE M. B. H., OF BERLIN, GERMANY, A CORPORATION OF GERMANY.

SYSTEM FOR REDUCING STATIC DISTURBANCES.

Application filed May 13, 1926, Serial No. 108,910, and in Germany May 23, 1925.

Arrangements are known among the receiving arrangements provided with means adapted to preclude atmospherics, in which the incoming oscillations are supplied from the antenna by way of two oscillation circuits being untuned with relation to one another, though possessing identical time-constants, to two rectifiers, the rectified currents being brought to act upon an indicator in opposite directions. By the aid of such an arrangement such oscillations as are set up by shock excitation in the aerial and in the circuits coupled therewith in the receiving apparatus, are compensated, whereas such oscillations whose frequency agrees with the wave of one of the two transfer or intermediate circuits, are preferably transmitted and thus brought to act upon the indicator device. But the transfer or feeding of the incoming oscillations to the rectifiers need not only be effected through two oscillation circuits, indeed, the two intermediate circuits can be constructed in the form of filter circuit, if desired, with the insertion of cable conductors. The condition upon which compensation is predicated consists in having the energies taken from the two rectifiers practically alike for shock-excited oscillations while the effects are dissimilar for the incoming oscillations. This condition is fulfilled whenever the intermediate circuits possess equal time-constants and when the amplitudes of the rectified energies, by suitable coupling, have been given identical values, while for the incoming oscillations, by tuning in one of the transfer or intermediate circuits, conditions are so chosen that the incoming oscillations are passed more readily.

One of the difficulties attendant upon the practical application of an arrangement of the kind hereinbefore described was that a suitable indicator instrument for the recording of these oscillations was not available. On the other hand, the potentials available for the actuation of the indicator devices were relatively small, seeing that direct current reception is concerned in which no heterodyne means are to be used, and since furthermore a differential action was worked with. On the other hand, recording and measuring instruments, while otherwise possessing high sensitiveness, are too sluggish to insure safe recording of high-speed signaling.

It is at this point where the present invention finds application in practice. According to the present invention, the rectified current or potential variations are employed for the control of a condenser arrangement whose light-permeable dielectric, under the influence of an electrostatic field, acts without inertia upon the brightness of passing light, and it is by the aid of these fluctuations in brightness or luminosity that the recording of the incoming signals is accomplished. A suitable form of construction of such an electro-optical arrangement comprises a Kerr cell, to be more precise, a condenser arrangement with a medium exhibiting low dielectric losses, for instance, pure nitro-benzol. Under the action of applied potentials, this dielectric exhibits double electric refraction so that incident polarized light is changed in its state of polarization, with the result that variations in light intensity are produced after passage through an analyzer. The electric field is inclined at an angle preferably of 45 degrees, with reference to the plane of polarization of the entering light, and within the medium the two components of the light propagate at different rates of speed, one perpendicular, and the other one parallel, with relation to the direction of the field, in the shape of the ordinary and the extraordinary rays, and there results in well known manner a more or less strong variation in luminous intensity in dependence upon the resultant phase difference.

Now, according to this invention, polarized light is sent through the medium of two Kerr cells arranged in series, the potential of one of the rectifiers being applied to one of said cells while that of the other rectifier is applied to the other cell, the optical arrangements being so chosen that, in case if similar dielectric materials of the two Kerr cells, the directions of the fields in the two Kerr cells are disposed with relation to one another at an angle of 90 degrees, so that the component at right angles to the direction of the field in one of the media is parallel to the direction of the field in the other medium, while similarly the parallel component of the first medium propagates perpendicularly in the second medium. In this case a compensation of the actions of the first cell is produced in the second cell, provided that the potentials across both cells, and the proportions of the cells, are alike.

A more clear conception may be had from considering the following description in view of the accompanying drawings of which Fig. 1 is a diagrammatic representation of an embodiment of my invention.

Figure 2:
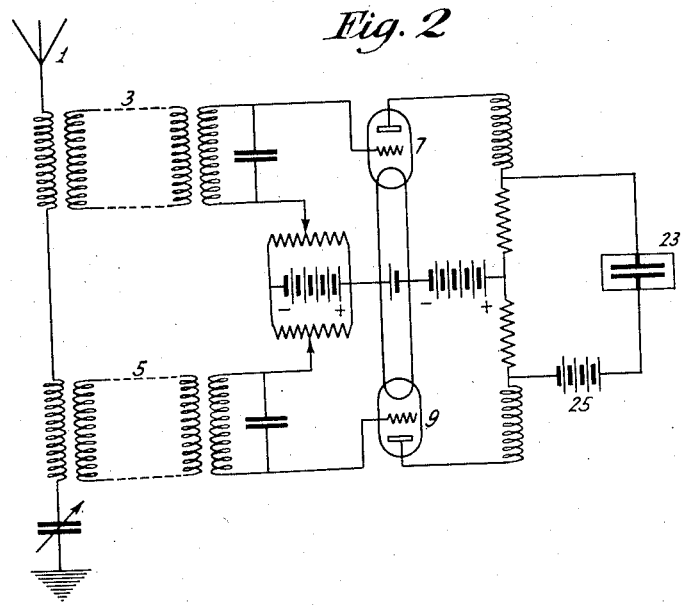

Fig. 2 is a diagrammatic representation of a modification of my invention.

A fundamental circuit arrangement according to the invention is illustrated in Fig. 1. Referring to the same, 1 is the aerial tuned by the usual condenser; 3 is one of the intermediate or coupling circuits, while 5 is the second one, 7 and 9 denote the two rectifier tubes of the thermionic kind. The optical equipment comprises the two Kerr cells 11 and 13, through the dielectric material 15 of which the light issuing from light source 17 by way of a lens and a polarization device 19 is passed. 21 is the analyzer from which the light, through a lens, is thrown upon the sensitive surface, for instance, a travelling film strip B. The potentials of the two rectifiers are applied to the two Kerr cells 11 and 13, the latter, as will be noted, being so arranged that their fields are at right angles to one another.

In the operation of this arrangement so far as atmospheric disturbances consisting of shock-excited impulses or aperiodic forced oscillations, are concerned, similar integral effects are produced in the two rectifiers so that equal potentials are applied across the Kerr cells with the result that their actions are compensated, in such a manner that with the polarizer and analyzer being crossed, darkness is produced. However, as regards the incoming waves for which the rectified energies are dissimilar their potentials at the two Kerr cells also will be different, with the result that no compensation is produced, and that a record or impression is produced on the sensitive surface or film.

Instead of using two Kerr cells with the same dielectric material, but displaced in direction of the field at an agle of 90 degrees with relation to each other, it also would be possible to employ two Kerr cells with different dielectrics, one thereof possessing a positive, and the other one a negative, Kerr constant, in other words, so that in one of said cells the ordinary ray travels faster than the extraordinary ray, whereas in the other one the extraordinary ray has a greater speed than the ordinary ray.

In the cases hereinbefore referred to, a compensation action is produced in the optical equipment. However, compensation is obtainable also by purely electrical means in such a manner that the Kerr cell is merely used as an indicator device. A circuit arrangement of this kind is depicted in Fig. 2. In this case, the two rectifiers 7 and 9, to which the incoming currents are fed by way of antenna 1 and the coupling coils 3 and 5 are arranged in opposition, the potential applied at the Kerr cell 23 being branched off from two rectifiers (the optical outfit being omitted). A direct current battery 25 serves in this arrangement for providing a steady direct current voltage across the cell 23. The direct current potential is usually provided also in the case of an arrangement as shown in Fig. 1, seeing that the operation of the Kerr cell is for various reasons dependent upon the provision of the direct current voltage.

Having described my invention, I claim:

1. A high frequency receiving system comprising an input having two detector circuits coupled thereto, a source of light, a light responsive means, a pair of light affecting devices comprising a polarizer and an analyzer between said light source and said light responsive means and a pair of Kerr cells serially arranged between said light affecting devices each of said Kerr cells being connected to one of said detector circuits.

2. A high frequency receiving system comprising an input having two detector circuits, individual coupling circuits therefor, one of said coupling circuits being tuned to the frequency of the desired received energy the other being untuned with relation to the first but both circuits having identical time constants, a source of light, a light responsive means, polarizing and analyzing devices between said light source and said light responsive means and a pair of Kerr cells serially arranged between said light polarizing and analyzing devices, each of said Kerr cells being connected to one of said detector circuits.

3. A high frequency receiving system comprising an input having two detector circuits coupled thereto, a source of light, a light responsive means, a pair of light polarizing devices between said light source and said light responsive means, and a pair of Kerr cells serially arranged between said light polarizing devices and having electrical fields therein, the arrangement of said cells being so chosen that the electrical fields are displaced with relation to each other by an angle of 90 degrees, each of said Kerr cells being connected to one of said detector circuits.

4. A high frequency receiving system comprising an input having two detector circuits, two coupling circuits untuned with relation to each other for coupling said detector circuits to said high frequency system, a condenser arrangement comprising a light permeable dielectric controlled by an electrostatic field in each of said detector circuits, means for affecting said electrostatic fields according to energy transferred to said detector circuits, means for passing polarized light through said condenser arrangement and means controlled by the amount of energy transferred from said coupling circuits to said detector circuits for determining the amount of light passed through said condenser arrangement.

5. A high frequency receiving system comprising an input having two detector circuits, coupling means therefor comprising two circuits untuned with relation to one another but possessing similar time constants, one of said circuits being tuned to the frequency of the desired received energy, a condenser arrangement comprising two series arranged Kerr cells having electrical fields therein, said arrangement being so chosen that the electrical fields of the two Kerr cells are displaced with relation to each other by an angle of 90 degrees, means for passing polarized light therethrough and means dependent on the amount of energy transferred from said coupling circuits to their respective detector circuits for determining the amount of light passed through said condenser arrangement.

6. A high frequency receiving system comprising an input having two detector circuits coupled thereto, a source of light, a light responsive means, a pair of light affecting devices comprising a polarizer and an analyzer between said light source and said light responsive means and a Kerr cell arrangement between said light affecting devices each of said detector circuits being connected to said Kerr cell arrangement and means controlled thereby for affecting said Kerr cell arrangement in accordance with signals desired to be received.

FRITZ SCHRÖTER.